United States Patent [19]
DeMarco

[11] 4,036,614
[45] July 19, 1977

[54] PRESSURE RELIEF MEANS FOR INDUSTRIAL VACUUM

[75] Inventor: Thomas M. DeMarco, Chicago, Ill.

[73] Assignee: NFE International, Ltd., Arlington Heights, Ill.

[21] Appl. No.: 560,945

[22] Filed: Mar. 21, 1975

[51] Int. Cl.² .......................................... B01D 46/42
[52] U.S. Cl. .................. 55/310; 55/341 NT; 55/366; 55/423; 55/429; 55/430; 55/466; 55/467; 55/484; 137/512.15; 137/855
[58] Field of Search ................... 55/309–311, 55/210, 213, 361, 366, 385 R, 471, 467, 341, 428–430, 423, 466, 484; 137/525.3, 512.15

[56] References Cited
U.S. PATENT DOCUMENTS

| | | | |
|---|---|---|---|
| 1,333,325 | 3/1920 | McGee | 55/310 X |
| 1,455,116 | 5/1923 | Lumley | 55/309 X |
| 1,590,885 | 6/1926 | Burns et al. | 55/310 X |
| 2,443,162 | 6/1948 | Hallock | 55/310 X |
| 2,548,374 | 4/1951 | Janson | 137/525.3 X |
| 2,778,445 | 1/1957 | Brixius | 137/525.3 X |
| 2,907,405 | 10/1959 | Marshall | 55/309 |
| 3,036,592 | 5/1962 | Lips | 137/525.3 X |
| 3,486,312 | 12/1969 | Kline et al. | 55/363 |
| 3,499,269 | 3/1970 | Bois | 55/309 |
| 3,653,191 | 4/1972 | Nelson et al. | 55/310 |
| 3,738,089 | 6/1973 | Brill | 55/310 |
| 3,780,502 | 12/1973 | Dupre et al. | 55/432 X |
| 3,783,590 | 1/1974 | Allen | 55/310 |
| 3,831,628 | 8/1974 | Kintner et al. | 137/525.3X |
| 3,883,030 | 5/1975 | Mathews et al. | 137/525.3 X |

FOREIGN PATENT DOCUMENTS 598,251  2/1948  United Kingdom ............ 55/309

Primary Examiner—Frank W. Lutter
Assistant Examiner—Kathleen J. Prunner
Attorney, Agent, or Firm—Merriam, Marshall, Shapiro & Klose

[57] ABSTRACT

Relief valve means for dissipating positive compressor pressures which could exist within an industrial vacuum unit after the unit is shut down. A high capacity one-way flow type of valve is mounted on the unit to allow a vacuum to be created within the unit during normal operation and to prevent a build-up of undesirable positive pressure that can result from the brief reverse operation of the compressor immediately after the power is shut off.

6 Claims, 4 Drawing Figures

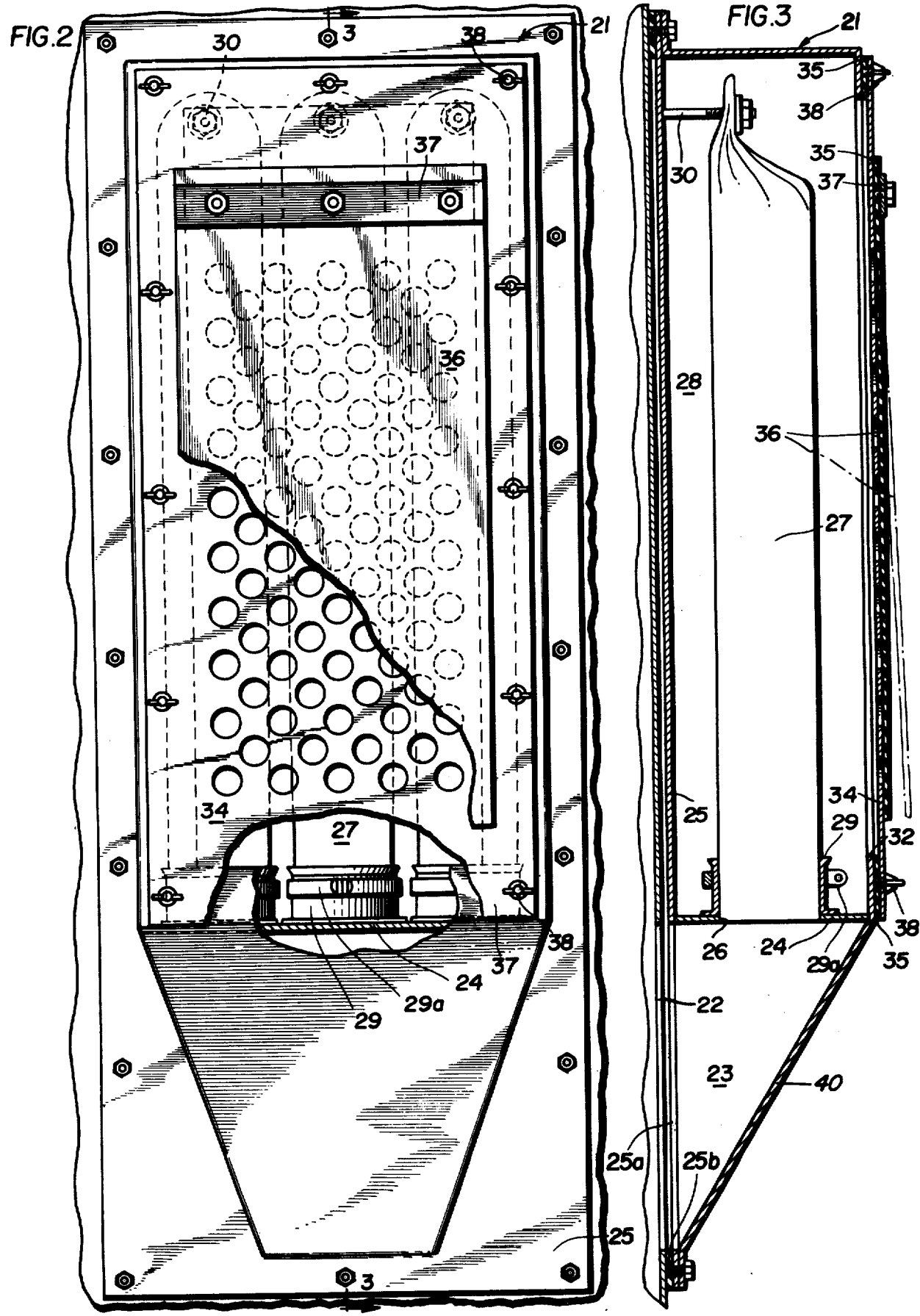

PRESSURE RELIEF MEANS FOR INDUSTRIAL VACUUM

BACKGROUND OF THE INVENTION

1. Field of the Invention

This invention relates generally to a heavy duty industrial vacuum unit and more particularly to pressure relieving means for relieving internal pressure within the unit.

2. Description of the Prior Art

In industrial vacuum units a positive pressure can exist therein after the vacuum unit is turned off. This problem occurs because residual internal vacuum pressures often result from clogged hoses, and this can cause the vacuum-creating compressor to reverse and run backwards. While a temporary reversal of the compressor is not undesirable, in that the associated reversed air flow cleans internal filters, the continued operation in reverse can create excessive positive pressures which are undesirable.

More specifically, when a vacuum unit is turned off, a residual negative pressure can exist within the unit if the vacuum hose is filled with debris or otherwise blocked, thus preventing relief of the internal negative pressure through the vacuum hose. If the hose is blocked when the compressor is turned off, the residual negative pressure will remain in the vacuum unit. This negative pressure can draw outside air backward through the compressor and thus cause the compressor to run in a reverse direction until the negative pressure is eliminated. However, once the compressor begins running in reverse it sometimes reaches high speeds and momentum which causes the compressor to overrun and continue running after the negative pressure has been eliminated.

Hence, a condition is created whereby the inside of the vacuum unit goes from a negative pressure to a brief interval of neutral pressure, wherein the inside and outside air pressures are matched, and then, by the momentum effect of the compressor, to a condition in which positive pressure can begin to build up within the unit. If there is no relief for this newly created positive pressure it is possible that the debris trapped within the hose or at the mouth of the hose could be rapidly discharged and/or dissipated, creating a potentially dangerous situation to personnel in the adjacent area.

SUMMARY

The present invention comprises a relief valve which prevents such positive pressure from being created during reverse running of the compressor, while at the same time allowing the compressor a short interval of reverse running to relieve vacuum pressure within the vacuum unit and also to provide a brief reverse air flow to assist in cleaning the filter elements within the unit.

This pressure relief valve can be easily attached to a heavy duty industrial vacuum unit with only a small amount of conversion work. The pressure relief valve may be easily attached to the negative pressure side of the vacuum unit, preferably near the internal vacuum filters. The valve includes a resilient flap sheet overlying a perforated plate to seal off the perforations when a negative pressure exists within the vacuum unit, and, to permit air flow through the perforated plate when a positive pressure is created within the unit or when it is desired to relieve the negative pressure within the vacuum unit. The relief valve also has a filtering element to clean and purify air being discharged from the vacuum unit.

The relief valve functions as an airtight portion of the vacuum unit when a negative pressure is present within the unit during normal vacuuming procedures.

These and other features and advantages of the invention will become apparent to those skilled in the art with reference to the following specifications, drawings and appended claims.

DESCRIPTION OF THE DRAWINGS

FIG. 2 is a front view of the pressure relief valve of this invention with portions removed for descriptive purposes; and, FIG. 3 is a sectional view taken generally along line 3—3 of FIG. 2.

DESCRIPTION OF PREFERRED EMBODIMENTS

Figure 1:
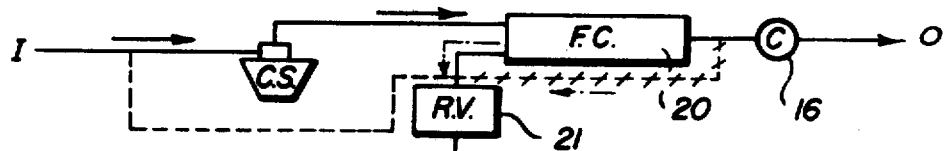
FIG. 1 is a schematic air flow diagram of the vacuum unit and relief valve.
Figure 1A:
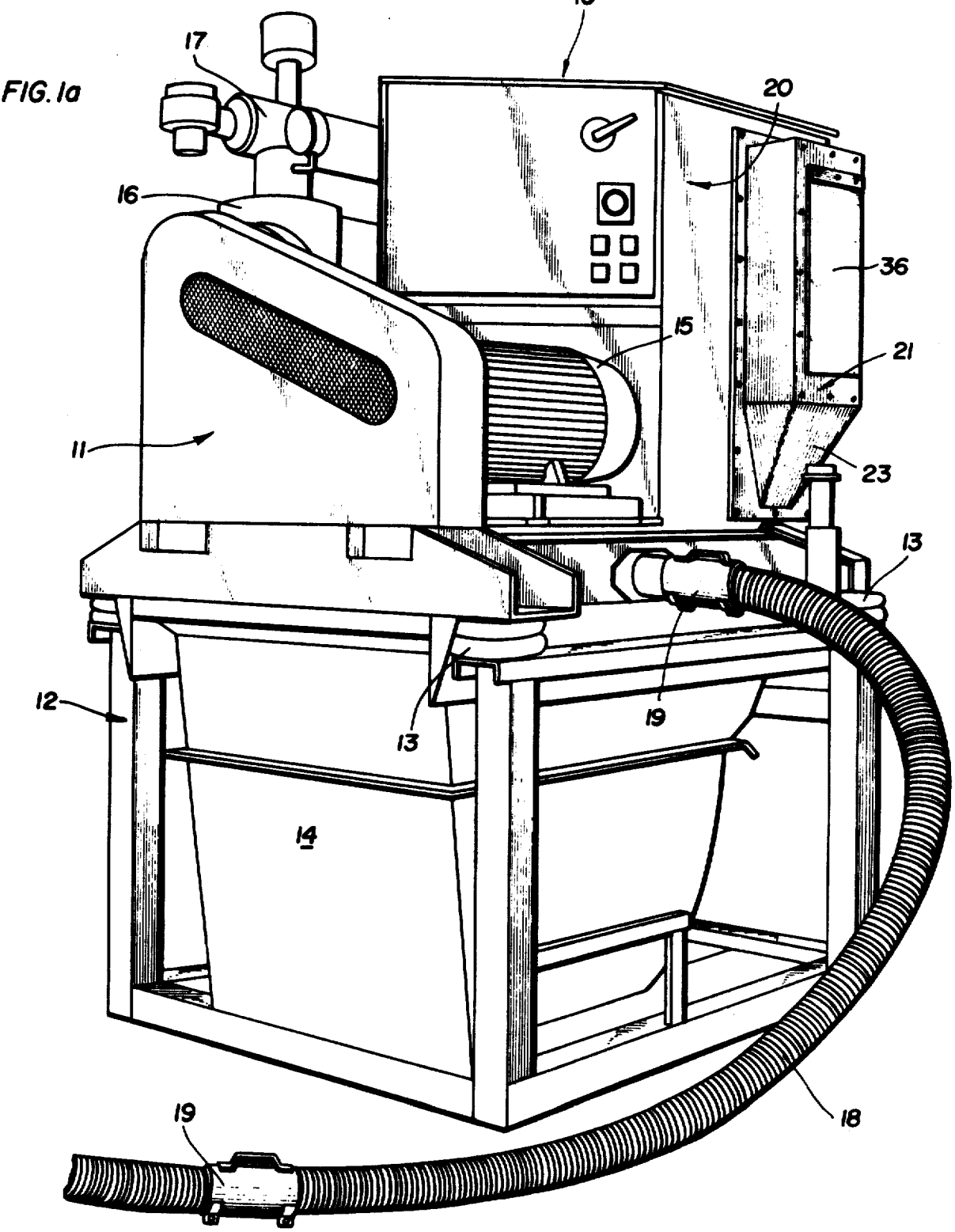
FIG. 1a is a pictorial illustration of an industrial vacuum unit with the relief valve of the present invention.

In FIG. 1a there is illustrated pictorially an industrial vacuum unit designated generally by the numeral 10. As may be typical of vacuum units, there is essentially an upper, equipment section 11 supported by a frame 12 and mounted on air lift members 13. A lower section includes a removable or otherwise movable type of hopper 14, which collects particles and thus must be easily removed for emptying.

The upper equipment section 11 includes a plurality of mechanical elements including a drive motor 15, connected to and powering a compressor 16 which creates a moving airstream. Attached to the discharge side of compressor 16 is a muffler or other similar sound absorbing device 17.

A heavy duty flexible hose 18 may be used to convey particulate matter and airborne fluid particles into the vacuum unit 10 and may be coupled to the vacuum unit by means of a flexible sheet type of coupling 19. Particles conveyed via the hose 18 initially enter a centrifugal separator (shown schematically in FIG. 1 as C.S.) positioned above the large hopper 14. Such a separator forms a first stage of the multi-stage filtering process and will cause the larger size airborne particles to fall out of the airstream and be collected in hopper 14. Assitional filtering means are located within a chamber 20 and may comprise a number of screen-type filter elements as well as a flow reversal chamber for additional filtering of such particles from an airstream.

The schematic flow diagram of FIG. 1 illustrates the arrangement of vacuum components and the path of air flow through the unit. As shown by the solid line arrows, airborne debris enters at I and enters the cyclonecentrifugal separator C.S. The airstream then proceeds through the intermediate filter chamber 20 (also designated F.C. in FIG. 1) and through the compressor 16 (also C in FIG. 1) for discharge through outlet O. Relief valve 21 (R.V. in FIG. 1) may be attached to the intermediate stage as shown by solid lines in FIG. 1. As shown by dash lines, and the dot-slash lines, relief valve 21 may also be attached between the inlet I and centrifugal separator C.S. or between filter chamber 20 and the compressor 16.

During reverse running of the compressor 16 normal backward flow in a direction opposite the solid line arrows would occur. In the event the inlet I were blocked or otherwise obstructed, air would exit through relief valve 21 following the direction of flow indicated by the dot-dash line arrows.

The relief valve of this invention may be attached to the wall of chamber 20 as shown at 21 in FIG. 1a. Prior to attaching the relief valve 21, an appropriate size opening 22 must be made at a convenient location in the side wall of chamber 20 (FIG. 3).

The relief valve 21 may include a sheet metal housing or may be constructed as a one-piece plastic molded unit. Referring to FIGS. 2—3, the relief valve 21 includes a tapered intake plenum 23 overlying an associated opening 25a in a back mounting plate 25, to initially receive air being discharged through opening 22 of the chamber 20. The plenum 23 includes a tapered surface 40 extending from the top of said plenum angularly downwardly towards the bottom thereof. Gasket 25b surrounds the periphery of back plate 25 to provide an airtight seal between the relief valve housing and chamber 20.

Above the intake plenum 23 is a header plate 24 having a plurality of openings 26. A filter bag 27 is positioned above each opening 26 and extends upwardly into an outlet chamber 28. A filter bag 27 may be held in place on header plate 24 by any convenient means such as by a short attaching collar 29 and an associated locking clamp 29a, which holds each bag firmly against the associated collar 29. The upper portion of each filter bag 27 may be held in an extended postion by a stud 30 extending from mounting plate 25 and inserted through the top end of the filter bag. Excess dust that falls from bags 27 will be directed into the vacuum unit 10 by the tapered surface 40 thus eliminating the need for a separate clean-out section on relief valve 21.

The relief valve 21 has a front or face which is spaced from the back wall 25 of the chamber 20 and includes a rectangular opening 32. A perforated plate 34 is placed over the opening 32 and may be spaced from the relief valve by a resilient gasket 35, which permits the perforated plate to be more securely fastened by suitable mechanical fastening means 38. Plate 34 is removable and thus permits free and easy assess to the inside of the relief valve 21 for changing the filter bags 27.

The relief valve 21 also includes a resilient flexible member, such as flap sheet 36 overlying the perforated plate 34. Flap sheet 36 has an upper edge portion attached to perforated plate 34 by a bar 37 and fastener means and a free lower edge portion. As a result, flap sheet 36 is pulled against perforated plate 34, in an air blocking fashion, when a vacuum is present within vacuum unit 10. When a positive pressure is created within the vacuum unit, such as would occur when the compressor is forced to run in a reverse direction by a residual vacuum after power to the unit is cut off, the movable portion of flap sheet 36 will be urged away from the plate 34, opening the valve and preventing positive pressure from being created within the unit by allowing air to flow outwardly from the unit.

The use of a relatively large relief valve such as described herein has been necessitated by the flow characteristics of pressurized air which moves through the vacuum unit during the short period of reverse operation of the compressor or blower. Perforated plate 34 has a sufficient number of openings to provide total opening area of adequate size to allow for rapid release of the large volume of pressurized air within vacuum unit 10. This rapid release of air prevents a build-up of high positive pressure inside the vacuum unit. If the relief valve 21 were not used, this pressure could be released via the hose 18 and could rapidly discharge material from within the hose. The relief valve 21 provides rapid release of air and pressure in a manner not available from conventional one-way pressure relief valves which have a low capacity and cannot rapidly release the large air flow that is present in an industrial vacuum.

The positioning of the relief valve 21 is optional. The relief valve will function as required as long as it is placed in a location between the inlet hose and the compressor (see FIG. ) to relieve internal pressure by releasing the required air flow to eliminate the residual vacuum within the vacuum unit. It has been disclosed here as being attached adjacent chamber 20 of vacuum unit 10. However, such attachment is merely for convenience in that it allows bags 27 to be cleaned by vibration from the filter shaker mechanism which is generally provided within the vacuum unit 10.

The foregoing description and drawings merely explain and illustrate the invention and the invention is not limited thereto, except insofar as the appended claims are so limited, as those who are skilled in the art and have the disclosure before them will be able to make modifications and variations therein without departing from the scope of the invention.

What is claimed is:

1. In an industrial vacuum unit having means for creating a flow of air and creating both a negative vacuum pressure and a positive pressure, pressure relief means comprising:

a housing mounted to said vacuum unit and having dividing means for partitioning said housing into a lower inlet chamber and an upper outlet chamber;

said vacuum unit having an opening and said inlet chamber having a first opening for receiving air from the vacuum unit through said opening and admitting same into said inlet chamber;

said dividing means having an opening for air flow between said inlet and outlet chambers;

said outlet chamber having outlet means providing an opening for releasing air from said housing;

movable sealing means mounted adjacent said outlet means; and, support means mounted to said housing intermediate said outlet means and said movable sealing means and engageable with said movable sealingmeans to cover said outlet means for providing an air-tight seal of said outlet means for preventing the flow of air through said pressure relief means when said negative vacuum pressure exists in said industrial vacuum unit and for permitting movement of the sealing means away from thesupport means to allow the flow of air through the outlet means and the support means when positive pressure exists in said vacuum unit;

filter means mounted in said outlet chamber for removing particles from said flow of air passing through the housing; and said inlet chamber having guide surface means extending below said filter means downwardly towards and in communication with said first opening for receiving said particles falling from the filter means and for downwardly directing these particles through said first opening and the opening of said vacuum unit and thereby into said industrial vacuum unit.

2. The industrial vacuum unit as recited in claim 1 wherein said movable sealing means comprises:
   resilient flap means having at least one edge portion movable in response to said positive pressure to permit said flow of air.

3. The industrial vacuum unit as recited in claim 2, wherein:
   said support means comprises a rigid plate having a plurality of air openings; and,
   said resilient flap means responsive to said negative and positive vacuum pressure for closing and opening said air openings to said flow of air.

4. The industrial vacuum unit as recited in claim 1, wherein said dividing means includes a plurality of openings for air flow between said inlet and outlet chambers, and wherein said filter means comprises:
   a plurality of elongated filter bags each having attaching means removably mounting said bags to said dividing means at a respective one of said openings; and
   said filter bags each extending upwardly into said outlet chamber from said dividing means.

5. The industrial vacuum unit as recited in claim 4, wherein said guide surface means comprises:
   an inclined chamber wall of said inlet chamber extending downwardly below said plurality of elongated filter bags for guiding particles received from the filter bags into the vacuum unit.

6. The industrial vacuum as recited in claim 1 wherein said support means comprises:
   a stop plate with openings therein for engaging said movable sealing means and restricting movement thereof to one direction.

* * * * *